Patented Sept. 3, 1940

2,213,557

UNITED STATES PATENT OFFICE 2,213,557

PRODUCE COATING COMPOSITIONS

Wendell H. Tisdale and Albert L. Flenner, Wilmington, Del., assignors to E. I. du Pont de Nemours & Company, Wilmington, Del., a corporation of Delaware No Drawing. Application August 26, 1937,
Serial No. 161,040

20 Claims. (Cl. 99—168)

This invention relates to the preparation of produce such as fresh fruits and vegetables for market, and is particularly directed to processes wherein produce is provided with a lustrous protective coating by treating the entire surface of the produce with an aqueous emulsion of a water-insoluble emulsion-polymer-resin.

In the preparation of produce, such as fresh fruits, melons, and vegetables, for market, it is customary to subject the produce to treatments designed for removing the spray residue, insects, dirt, and other foreign bodies, and to destroy as much as possible any active fungi which may be present. As natural waxes and similar protective materials normally present in the skin or covering of the produce are removed or damaged in the course of these treatments, the natural appearance and keeping qualities of the produce are frequently impaired. Consequently, it is customary to subject the produce to further treatment designed to improve its appearance and keeping qualities.

Treatments of the latter type generally involve the use of suitable coatings for reducing desiccation, for imparting luster or gloss to the produce, and in some cases for inhibiting the development of fungi. The nature and character of these treatments, as well as the nature and character of the resulting coatings, must be adapted to the peculiar nature of the produce treated. For example, as an efflux and influx of air or other gases are essential to ripening or similar life process of produce, a critical control of desiccation must be maintained. The coating must be sufficiently impervious to prevent excessive desiccation over the period required for marketing yet sufficiently porous to permit the natural functions of the produce and to prevent the entrapment of undesirable gaseous products resulting from such functions. Much effort is accordingly being directed toward treatments and coating compositions having characteristics adapting them to the preparation of produce for market.

It is a recognized fact that the suitability of a composition for coating fruit and other produce cannot be foretold from its general suitability for coating, partly because of the peculiar requirements of produce coatings previously mentioned, partly because of the difficulty of obtaining wetting, adhesive and cohesive properties meeting the requirements of produce coating compositions, particularly together with the requisite properties of hardness, toughness, pliability, and luster, and partly because of the susceptibility of produce to contamination by foreign odors and tastes.

Consequently, notwithstanding the vast number of coating compositions available for general purposes, only a few satisfactory produce coating compositions such as indicated below are available at present.

It has been proposed to treat produce with melted paraffin for this purpose, but the process is expensive and the heat required is often detrimental. While some improvement in these respects has been obtained by spraying melted paraffin, special equipment and technique is required. Paraffin coating, furthermore, whether produced by dipping or spraying is inherently incapable of developing a high degree of luster or gloss without buffing.

It has also been proposed to treat produce with emulsions of waxy materials such as carnauba wax and paraffin. Such emulsions, altho well suited for preparing produce for market, are disadvantageous in a number of respects, the most outstanding of which is that a high degree of luster or gloss cannot uniformly be obtained without buffing or polishing. Aside from the fact that this involves additional processing, injury to the produce frequently results.

Moreover, the amount of wax which may be emulsified in the form of a stable, dispersible emulsion is limited by the viscous nature of these emulsions when prepared in concentrated form. Consequently, where facilities are not available for the preparation of emulsions at the treating plant, transportation costs are excessive. Moreover, viscous emulsions present additional problems in handling and in the preparation of suitable treating baths.

It has also been proposed to coat produce with latex. Such coatings, however, are relatively opaque and obscure rather than enhance the natural appearance of the produce. Moreover, such coatings are relatively soft and are incapable of taking a high polish. It may be pointed out also that latex is unsuited to the existing commercial practices, as in drying it often remains sticky at first and requires special treatment with talc or chemical means to prevent adhesion to similarly treated produce or the apparatus employed. Moreover, latex requires special processing to remove odoriferous impurities and to prevent deterioration.

We have now found that by treating produce with an aqueous emulsion of an emulsion-polymer-resin, the produce upon being subjected to surface drying conditions is provided with a protective film which imparts materially improved appearance to the produce and prevents excessive desiccation.

By dipping or spraying produce with emulsion-polymer-resin emulsions and drying the so-treated produce, a thin, tenacious, tough, pliable, lustrous, protective film of high gloss is formed upon the produce. A high degree of luster and gloss is obtainable directly upon drying, thus dispensing with the necessity of any further processing, such as polishing or buffing. Moreover, the films or coatings resulting from this treatment have the requisite porosity for normal development of the produce yet are sufficiently impervious to prevent excessive desiccation.

Emulsion-polymers are prepared in emulsified form by subjecting emulsions of a polymerizable monomeric compound to conditions conducive to polymerization. As the individual polymers, however, differ widely in their physical properties, ranging from resinous solids to gels or viscous liquids only such polymers as exhibit resinous properties are included herein and in the expression "emulsion-polymer-resin".

Emulsion polymerization processes, as well as monomeric compounds suitable for forming polymer-resins by such processes, are well known to those skilled in the art. Likewise, emulsions so prepared have been suggested as suitable for coating or impregnating porous articles such as cloth and leather. Consequently, such technique as has been developed in the art for these purposes, insofar as it is applicable to the specific problems encountered in the treatment of produce, may be utilized in the preparation of emulsions suitable for use in the processes of this invention.

In general, suitable polymerizable monomeric compounds which may be employed for producing emulsion-polymer-resins are characterized by the presence of a substituted ethylene group, for example, the vinyl compounds such as vinyl esters and styrene, and the acryl compounds such as acrylic acid esters nitriles, and amides, and the corresponding alpha and beta substituted homologues.

Particularly good results have been obtained with the various esters of acrylic acid and alpha-substituted acrylic acids such as methyl, ethyl, propyl, and butyl acrylates, and methyl ethyl, propyl, butyl, isobutyl, and methoxyethyl methacrylates either alone or in suitable combinations.

Emulsions obtained by polymerizing monomeric emulsions are particularly suitable for use in the treatment of produce as in this manner the polymeric emulsion retains the same high degree of dispersion and the same or a greater degree of stability as compared with the monomeric emulsion. Moreover, the process avoids the use of organic solvents such as would tend to impart objectionable odors and tastes to the produce treated.

Emulsions suitable for use in the processes of this invention and characterized in that the disperse phase consists predominately of an emulsion-polymer-resin may include modifiers for imparting improved film-forming properties, for decreasing porosity and reducing desiccation, for varying the hardness, toughness, and adhesiveness of the resulting coating, or for imparting such other modified properties thereto, as may be desired.

Plasticizers for imparting film-forming properties to emulsion-polymer-resins should be incapable of imparting foreign odors or tastes, or otherwise deleteriously affecting the produce. For this purpose I have found esters of phthalic acid, such as dibutyl phthalate, and phthalates prepared from mixtures of alcohols containing from four to eight carbon atoms, to be particularly suitable. The plasticizer is preferably dissolved in a monomeric ester prior to emulsification and polymerization so that its action directly modifies the acrylate polymer-resin.

A careful balance between the physical properties of the resin and the amount of plasticizer is required to obtain good film-forming properties without imparting stickiness to the film. Sufficient plasticizer should be employed to produce a softening temperature which will cause the particles of resin in the emulsion to adhere to each other and form a continuous film under the conditions of drying employed in any particular installation. In view of the diverse condition in which the emulsions are applied and in view of the different physical properties of the different individual resins, no criteria can be given for the amount of plasticizer required. In general, however, it has been observed that generally excellent results are obtained when sufficient plasticizer is included to give a clear, continuous, non-tacky film upon drying at room temperature.

In certain instances the films formed, altho imparting high gloss and improved appearance to the produce, are not sufficiently impervious to adequately protect produce such as citrous fruits, which are subject to excessive desiccation. Where such produce is treated, it is accordingly desirable to include a suitable resinous, gummy, or waxy material to reduce the porosity of the film formed. For this purpose we have found damar to be particularly effective. Other materials, however, such as ester gum, modified alkyd resins, and other natural or artificial waxy or resinous materials may be employed with satisfactory results. These materials are preferably dissolved with the monomeric ester prior to the emulsification and polymerization so as to directly modify the properties of the acrylate polymer-resin.

The physical properties of the polymer-resin films according to this invention may be modified as to hardness toughness, pliability, and adhesiveness, by the use of suitable inter-polymeric combinations. Thus co-polymers or inter-polymers produced by the joint polymerization of two or more different monomers may be used effectively to obtain a wide variety of physical properties. For example, the polymerization of mixtures of monomeric methyl and butyl methacrylates produce resins having properties intermediate of the resins obtainable by polymerizing the monomers individually. Other inter-polymers such as the polymer of vinyl acetate and vinyl chloride, especially with about 75 to 90 per cent vinyl chloride, are suitable. These and other inter-polymeric combinations may be employed advantageously in producing highly desirable emulsions for coating produce according to this invention. Similar results may also be obtained with simple polymeric combinations by proper mixing of two or more emulsions of different polymers.

Further modifications in the produce coating compositions of this invention may be made as desired. For example, oil-soluble dyes, such as oil-soluble food dyes, may be incorporated in the emulsion to enhance the color of the produce. This is of particular usefulness in connection with citrous fruits, such as oranges, tangerines, and grapefruit, wherein food dyes are commonly employed for this purpose. By including the dye in the coating composition the usual independent dyeing procedure as practiced in the art may be eliminated.

We have found further that methacrylate polymer-resin emulsions possess certain inherent fungicidal action. While this has been found to be effective for inhibiting the growth of blue mold and similar fungal infestations, the growth of certain other fungi such as those responsible for stem end rot is not so effectively prevented. Consequently, if desired, additional decay retarding agents may be included in the emulsion. In addition to the water-soluble compositions customarily employed, such as borax, boric acid, sodium benzoate, and the like, oil-soluble fungicides may be dissolved in the monomeric solution prior to emulsification and polymerization, or dispersed in the emulsion subsequent to polymerization.

The following example is illustrative of the manner in which compositions of this invention may be prepared:

*Example I*

A solution was prepared by stirring together 20 parts by weight damar, 0.65 part benzoyl peroxide (polymerization catalyst), 32.8 parts butyl methacrylate monomer, 32.8 parts methyl methacrylate monomer, and 14.4 parts dibutyl phthalate, and filtered thru a mat of cotton to remove traces of the insoluble material contained in the damar. The monomeric solution was then added to 300 parts of water containing 14 parts of a 50 per cent aqueous solution of the sodium salt of octadecanediol acetate sulfate, and after thorough shaking poured into a colloid mill and recycled for three minutes to produce a stable emulsion. The emulsion was then drawn off into a closed container and heated for 48 hours at 65° C. to effect polymerization of the methacrylic esters.

This procedure produces an emulsion containing about 25 per cent solids, about 3½ per cent emulsifying agent, and the balance water, the per cent of emulsifying agent being figured inclusive of its water content.

More concentrated emulsions may be prepared, if desired, with little change in the above procedure, by using one-third (100 parts) the amount of water solution and preparing the monomeric emulsion by pouring the monomeric solution into the water solution as the latter is circulating in the colloid mill.

Compositions produced in this manner contain 50 per cent solids, 7 per cent emulsifying agent, and the balance water, the per cent of emulsifying agent being figured inclusive of its water content. Compositions of this type are more suitable for transportation than less concentrated ones, and are readily dispersible for the production of more dilute emulsions, as required in the treatment of produce.

In treating produce the concentrated emulsions are diluted with water to about 8.3 per cent solids to give a bath of the following composition:

| | Per cent |
|---|---|
| Methyl methacrylate } inter-polymer | 2.7 |
| Butyl methacrylate  } | 2.7 |
| Damar | 1.7 |
| Dibutyl phthalate | 1.2 |
| Emulsifying agent | 1.2 |
| Water | 91.5 |

This bath has been found particularly suitable for the treatment of citrous fruits, as it not only imparts a high luster and gloss to the fruit, but also materially retards desiccation.

The fruit may be dipped in the bath or sprayed, and then subjected to surface drying conditions, in accordance with the procedure preferred at any particular treating plant. Upon drying the treatment is complete and no further processing, such as polishing and buffing, is required to bring about optimum conditions of luster and gloss. Oranges, tangerines, and grapefruit treated with this composition have exhibited improved keeping qualities during the period of marketing and improved appearance over the same period as compared with the same produce treated with wax emulsions.

It will be understood that the above example is given by way of illustration only and that considerable variation may be made, both in the process of preparing the emulsion and in the ingredients employed. Thus various methods of emulsifying the monomer instead of using a colloid mill or the particular emulsifying agent specified, and various means of polymerizing monomeric emulsions are available. Likewise, monomeric emulsions of varying constituency suited to the production of emulsion-polymer-resin emulsions having the desired properties may be employed.

The amount of emulsifying agent specified in the above example is larger than the amount required for producing a monomeric emulsion suitable for polymerizing. This excess is included for the purpose of improving the wetting out properties of the emulsion and may be varied considerably, according to the reqirements of the particular produce treated. It is not essential that the excess emulsifying agent be added prior to polymerizing, as equally good results may be obtained by adding the required amount of wetting agent thereafter. Likewise, it is not required that the wetting agent be of the same type as the emulsifying agent employed in emulsifying the monomeric solution. Any suitable wetting agent may be employed.

As various emulsifying agents suitable for emulsifying monomeric solutions are well known in the art, it is to be understood that my invention is in no way limited to the particular emulsifying agent specified in the examples given above. We have found, however, that emulsifying agents obtained by sulfating straight chain alcohols of more than seven carbon atoms such as sodium decyl sulfate, and particularly those obtained by sulfating esters or ethers of unsaturated alcohols containing more than seven carbon atoms such as the sodium salt of octadecanediol acetate sulfate, are especially effective not only for emulsifying the monomer but also for imparting wetting properties to the polymeric emulsion.

Moreover, as the compositions prepared in accordance with this invention are intended for subsequent dilution in the treating plant, these higher alcohol sulfates are particularly advantageous in that the resulting emulsions are stable both in the presence of hard water or fruit acids. Consequently, emulsions so prepared may be diluted at the treating plant without previous treatment of the water to prevent coagulation. Likewise, they may be empoyed in the treatment of citrous fruits without danger of coagulation by fruit acids exuded from broken or injured fruit.

The term, "higher alcohol sulfates," as used above, refers to emulsifying agents prepared by sulfating alcohols containing more than seven carbon atoms, their esters and ethers, whether the resulting product be a true sulfonic acid or merely a sulfuric acid ester.

The more common emulsifying agents such as soaps and sulfonic acids produce negatively charged emulsions, whereas quaternary ammonium compounds such as lauryl piperidinium bromide and cetyl trimethyl ammonium bromide produce positively charged emulsions. As good emulsion may be obtained with either type, it may be found advantageous for some produce to employ the positive type to obtain better wetting of the produce, depending, of course, upon what charges are developed on the surface of the produce as a result of preliminary treatments.

Various other modifications in the nature of the emulsion-polymer-resin emulsions have been previously indicated. The following examples, giving percentage compositions of monomeric solutions suitable for emulsification and polymerization by the processes set forth in the preceding examples, are illustrative. It is evident that these percentages apply not only to the composition of the monomeric solution but also to the composition of the solid constituent or disperse phase of the resulting emulsion.

*Example II*

| | Per cent |
|---|---|
| Methyl methacrylate | 80.0 |
| Dibutyl phthalate | 20.0 |

Emulsions prepared from this composition in accordance with the processes outlined in Example I, employing the sodium salt of sulfated decyl alcohol as an emulsifying agent, produced films which were somewhat hard and brittle, and slightly cloudy. The cloudiness, however, was removed by polishing. Moreover, with the sodium salt of octadecanediol acetate sulfate as an emulsifying agent, cloudiness was avoided.

In an effort to reduce the hardness, plasticizer was increased to as much as 50 per cent. Altho the hardness was reduced in this manner, considerable tackiness was imparted to the resulting film.

Though satisfactory coatings were obtained from this emulsion, better results are obtained with softer resins, as illustrated by the following example:

*Example III*

| | Per cent |
|---|---|
| Butyl methacrylate | 90.0 |
| Dibutyl phthalate | 10.0 |

Since the butyl methacrylate produces a softer resin than methyl methacrylate, excellent film-forming properties were obtained with smaller amounts of plasticizer. Excellent coatings were obtained with the polymerized composition, particularly where sulfated esters of unsaturated long chain alcohols were employed as emulsifying agents.

*Example IV*

| | Per cent |
|---|---|
| Propyl methacrylate | 78.7 |
| Dibutyl phthalate | 21.3 |

Polymeric emulsions prepared from this composition are very similar to those of Example II.

*Example V*

| | Per cent |
|---|---|
| Methyl methacrylate | 40.0 |
| Butyl methacrylate | 40.0 |
| Dibutyl phthalate | 20.0 |

With the exception of porosity, films obtained from the polymeric emulsion are comparable in all respects to those obtained in Example I. The films obtained, however, are not sufficiently impervious to prevent a substantial amount of desiccation. Compositions of this type, however, may be employed advantageously in the treatment of produce such as apples, where desiccation is a minor factor.

Where desiccation is an important factor, as with citrous fruits, we prefer to employ the composition of Example I. Other modifications, however, exhibiting an improved desiccation factor as compared with Examples II, III, IV, and V are illustrated by the following examples:

*Example VI*

| | Per cent |
|---|---|
| Methyl methacrylate | 32.8 |
| Butyl methacrylate | 32.8 |
| Damar | 18.0 |
| Asiatic wax (high melting paraffin) | 2.0 |
| Dibutyl phthalate | 14.0 |

The properties of the polymeric emulsion are very similar to those of the composition of Example I. Substantially the same improvement in the desiccation factor is obtained by substituting Asiatic wax for part of the damar.

*Example VII*

| | Per cent |
|---|---|
| Butyl methacrylate | 72.0 |
| Damar | 20.0 |
| Dibutyl phthalate | 8.0 |

The polymeric emulsion is very similar to that of Example III, but offers improved resistance to desiccation. The coating obtained, however, is somewhat softer than that obtained in Example I.

*Example VIII*

| | Per cent |
|---|---|
| Methyl methacrylate | 35.7 |
| Butyl methacrylate | 35.7 |
| Diethylene glycol-coconut oil modified alkyd resin | 13.0 |
| Dibutyl phthalate | 15.6 |

The polymeric emulsion exhibits properties very similar to the composition of Example I, altho the resistance to desiccation is somewhat less.

*Example IX*

| | Per cent |
|---|---|
| Methyl methacrylate | 32.6 |
| Butyl methacrylate | 32.8 |
| Ester gum | 20.0 |
| Dibutyl phthalate | 14.4 |

This composition, following emulsification and polymerization, exhibits improved properties with respect to desiccation as compared with Example VIII, but slightly less as compared with Example I.

*Example X*

| | Per cent |
|---|---|
| Butyl methacrylate | 77.0 |
| Damar | 20.0 |
| Dibutyl phthalate | 3.0 |

The hardness, toughness, pliability, adhesiveness, and resistance to desiccation of film obtained with this composition approaches that of Example I. In conjunction with the damar a smaller amount of plasticizer may be used with the result that a harder film is obtained without the use of the harder methyl methacrylate as in Example I.

Example XI

| | Per cent |
|---|---|
| Methyl methacrylate | 56.0 |
| Damar | 20.0 |
| Dibutyl phthalate | 24.0 |

Altho this composition is similar to that of Example X the increased amount of plasticizer required to plasticize the harder methyl methacrylate imparted some stickiness to the resulting film.

Similar results were also obtained by the following composition:

Example XII

| | Per cent |
|---|---|
| Propyl methacrylate | 70.0 |
| Damar | 20.0 |
| Dibutyl phthalate | 10.0 |

Example XIII

| | Per cent |
|---|---|
| Styrene | 75.0 |
| Dibutyl phthalate | 25.0 |

Emulsions prepared according to this example gave films of slightly less luster than the methacrylate emulsions but softer than the films obtainable with the methyl methacrylate emulsions of Example II.

Example XIV

| | Per cent |
|---|---|
| Butyl methacrylate | 32.8 |
| Styrene | 32.8 |
| Damar | 20.0 |
| Dibutyl phthalate | 14.4 |

Films obtained from the emulsions of this example were similar to those of Example I though somewhat softer.

As previously pointed out and as will be apparent from the foregoing examples, it is desirable to proportion the amount of plasticizer according to the nature of the resin employed and to maintain a proper balance between satisfactory continuous film-forming properties and the tackiness of the resulting films. Thus where the tackiness is excessive the amount of plasticizer may be reduced accordingly. Likewise, the film-forming properties may be varied with some produce by varying the temperature condition during drying. Similarly the composition may be varied to suit particular climatic conditions of the region and time of application.

While we have mentioned emulsions containing about 8.3 per cent solids as suitable for coating oranges and similar produce, it is obvious that more or less concentrated emulsions may be employed. More concentrated emulsions, for example, may be employed for producing heavier coatings. In this manner apples, tomatoes, and like produce may be coated with relatively heavy transparent films of high gloss, which may be easily stripped from the produce prior to use.

Numerous modifications have been suggested above and illustrated in the foregoing examples. It will be apparent that these and other variations may be made without departing from the spirit of this invention wherein produce is provided with a protective coating by treating the produce with an aqueous emulsion of an emulsion-polymer-resin and subjecting the so-treated produce to surface drying conditions.

The processes and coating compositions of this invention are useful in treating a large variety of produce such as fruits, nuts, vegetables, and even eggs, and are particularly advantageous in that the appearance and resistance to desiccation and decay are not only improved but also maintained over a normal period of marketing. Produce treated according to this invention may be marketed with the assurance not only that its improved appearance may be retained over the period required for marketing but also that its original, firm, live appearance will be maintained undiminished over the same period.

We claim:

1. In a process for preparing produce for marketing the steps comprising coating the entire surface of the produce with an aqueous emulsion, the dispersed phase of which is a thermoplastic emulsion-polymer-resin, the principal component of which is derived from the polymerization of at least one monomeric compound containing a substituted ethylene group, and then exposing the produce to surface drying conditions at a temperature above the softening point of the resin.

2. In a process for preparing produce for marketing the steps comprising coating the entire surface of the produce with an aqueous emulsion, the dispersed phase of which is a thermoplastic emulsion-polymer-resin, the principal component of which is derived from the polymerization of at least one ester of methacrylic acid, and then exposing the produce to surface drying conditions at a temperature above the softening point of the resin.

3. In a process for preparing produce for marketing the steps comprising coating the entire surface of the produce with an aqueous emulsion, the dispersed phase of which is a thermoplastic emulsion-polymer-resin, the principal component of which is derived from the joint polymerization of methyl and butyl methacrylate, and then exposing the produce to surface drying conditions at a temperature above the softening point of the resin.

4. In a process for preparing produce for marketing the steps comprising coating the entire surface of the produce with an aqueous emulsion, the dispersed phase of which is a thermoplastic emulsion-polymer-resin the principal component of which is derived from the joint polymerization of methyl and butyl methacrylate and dibutyl phthalate, and then exposing the produce to surface drying conditions, the amount of dibutyl phthalate and the temperature during drying being so correlated that a continuous non-tacky film of high gloss is obtained.

5. In a process for preparing produce for marketing the steps comprising coating the entire surface of the produce with an aqueous emulsion, the dispersed phase of which is a thermoplastic emulsion-polymer-resin the principal component of which is derived from the joint polymerization of methyl and butyl methacrylate, dibutyl phthalate, and dammar, and then exposing the produce to surface drying conditions, the amount of dibutyl phthalate and the temperature during drying being so correlated that a continuous non-tacky film of high gloss is obtained and the amount of dammar being sufficient materially to reduce desiccation losses in produce so treated.

6. A composition o° matter comprising an aqueous emulsion, the dispersed phase of which is a thermoplastic emulsion-polymer-resin the principal component of which is derived from the joint polymerization of methyl and butyl methacrylate, dibutyl phthalate, and dammar, the dibutyl phthalate being present in amount sufficient to impart film-forming properties on drying at normal temperatures and the dammar being present in amount sufficient to impart impermeability to the film so produced.

7. A composition of matter comprising an aqueous emulsion, the dispersed phase of which is a thermoplastic emulsion-polymer-resin containing about 20 per cent dammar, about 15 per cent dibutyl phthalate, and the balance substantially an interpolymer of methyl and butyl methacrylate in substantially equal proportions.

8. In a process for preparing produce for marketing the steps of coating the entire surface of the produce with an aqueous emulsion the dispersed phase of which is a normally solid, thermoplastic, synthetic resin, the principal component of which is selected from the class consisting of polyvinyl and polyacryl compounds, and then exposing the produce to surface drying conditions at a temperature above the softening point of the resin.

9. In a process for preparing produce for marketing the steps of coating the entire surface of the produce with an aqueous emulsion the dispersed phase of which is a normally solid, thermoplastic, synthetic resin, the principal component of which is a polyacryl compound, and then exposing the produce to surface drying conditions at a temperature above the softening point of the resin.

10. A produce coating composition adapted when diluted to be applied to produce by dipping or spraying and when so applied to dry to a thin continuous film of high gloss comprising an aqueous emulsion the dispersed phase of which is a normally solid, thermoplastic, synthetic resin, the principal component of which is selected from the group consisting of polyvinyl and polyacryl compounds polymerized in situ in said emulsion.

11. A produce coating composition adapted when diluted to be applied to produce by dipping or spraying and when so applied to dry to a thin continuous film of high gloss comprising an aqueous emulsion the dispersed phase of which is a normally solid, thermoplastic, synthetic resin, the principal component of which is a polyacryl compound polymerized in situ in said emulsion.

12. A produce coating composition adapted when diluted to be applied to produce by dipping or spraying and when so applied to dry to a thin continuous film of high gloss comprising an aqueous emulsion the dispersed phase of which is a thermoplastic emulsion-polymer-resin, the principal component of which is derived from the polymerization of at least one monomeric compound containing a substituted ethylene group.

13. A produce coating composition adapted when diluted to be applied to produce by dipping or spraying and when so applied to dry to a thin continuous film of high gloss comprising an aqueous emulsion the dispersed phase of which is a thermoplastic emulsion-polymer-resin, the principal component of which is derived from the polymerization of at least one ester of methacrylic acid.

14. A produce coating composition adapted when diluted to be applied to produce by dipping or spraying and when so applied to dry to a thin continuous film of high gloss comprising a aqueous emulsion the dispersed phase of which is a thermoplastic emulsion-polymer-resin, the principal component of which is derived from the joint polymerization of methyl and butyl methacrylate.

15. A produce coating composition adapted when diluted to be applied to produce by dipping or spraying and when so applied to dry to a thin continuous film of high gloss comprising an aqueous emulsion the dispersed phase of which is a thermoplastic emulsion-polymer-resin, the principal component of which is derived from the joint polymerization of methyl and butyl methacrylate and dibutyl phthalate in such proportions as to give a clear, continuous, non-tacky film upon drying at room temperature.

16. A produce coating composition adapted when diluted to be applied to produce by dipping or spraying and when so applied to dry to a thin continuous film of high gloss comprising an aqueous emulsion the dispersed phase of which is a thermoplastic emulsion-polymer-resin, the principal component of which is derived from the joint polymerization of methyl and butyl methacrylate, dibutyl phthalate, and dammar, in proportions such as to give a clear, continuous, non-tacky film upon drying at room temperature.

17. In a process for preparing produce for marketing the steps of coating the entire surface of the produce with an aqueous emulsion the dispersed phase of which is a normally solid, thermoplastic, synthetic resin, the principal component of which is an emulsion-polymer, and then exposing the produce to surface drying conditions at a temperature above the softening point of the resin.

18. In a process for preparing produce for marketing the steps of coating the entire surface of the produce with an aqueous emulsion the dispersed phase of which is a normally solid, thermoplastic, synthetic resin, the principal component of which is a polymeric compound polymerized in situ in said emulsion, and then exposing the produce to surface drying conditions at a temperature above the softening point of the resin.

19. A produce coating composition adapted when diluted to be applied to produce by dipping or spraying and when so applied to dry to a thin continuous film of high gloss comprising an aqueous emulsion the dispersed phase of which is a normally solid, thermoplastic, synthetic resin, the principal component of which is an emulsion-polymer.

20. A produce coating composition adapted when diluted to be applied to produce by dipping or spraying and when so applied to dry to a thin continuous film of high gloss comprising an aqueous emulsion the dispersed phase of which is a normally solid, thermoplastic, synthetic resin, the principal component of which is a polymeric compound polymerized in situ in said emulsion.

WENDELL H. TISDALE.
ALBERT L. FLENNER.